July 9, 1968  S. W. ALDERFER  3,392,072
TIRE CONSTRUCTION
Filed Sept. 1, 1964  8 Sheets-Sheet 3

INVENTOR.
STERLING W. ALDERFER
BY Hamilton & Cook
ATTORNEYS

United States Patent Office 3,392,072
Patented July 9, 1968

1

3,392,072
TIRE CONSTRUCTION
Sterling W. Alderfer, Akron, Ohio, assignor to Sterling Alderfer Company, Akron, Ohio, a corporation of Ohio
Filed Sept. 1, 1964, Ser. No. 393,704
7 Claims. (Cl. 156—123)

The present invention relates to improvements in tire construction. More particularly, the invention relates to an inflatable tire which can be carried separately from a mounting rim or wheel. Specifically, the invention relates to an inflatable tire, without bead wire reinforcement, which is uniquely suitable for use on vehicles under a wide variety of conditions.

Heretofore, the tire art has not known of a commercially practicable beadless tire which would stand up under long periods of normal use, as distinguished from a temporary or emergency use, under actual operating conditions. Therefore, it is an object of the invention to provide improvements in the construction of inflatable tires, without bead reinforcement, which can be compactly stored prior to mounting and which are usable under a wide variety of conditions.

More specifically, further objects of the invention include the provision of a fabric ply tire having a profile of greater width than height and with circumferential strand elements restricting the expansion of an inflated tire when mounted on a vehicle member such as a rim or wheel having radially outwardly directed side flanges; the tire being held on the rim or wheel solely by the pressure of inflation and the restriction of the strand elements.

Still further, it is an object of the invention to provide a beadless fabric ply tire which has an integral, interior puncture-sealing element on at least one sidewall for use in selective inflation and deflation of the tire, during the production thereof, and if desired, during normal use.

Still further, it is an object to provide a beadless fabric ply tire with sidewalls especially shaped and contoured to carry a removable or replaceable tread band.

It is a still further object of the present invention to provide a tire construction, as above, which is readily mountable on a standard rim, whether flat base or drop center.

It is an even further object of the present invention to provide a tire construction, as above, which can also be readily mounted on specially adapted rims having low side flanges and constructed with preselected convolutions to control the side exposure of the tire between the rim and the tread.

These and other objects of the invention, as well as the numerous advantages thereof will be apparent, in view of the following detailed description of several embodiments of the invention and the attached drawings. The several embodiments are shown by way of example without attempting to show all of the various forms and modifications in which the invention might be embodied; the invention being measured by the appended claims and not by the details of the specification.

2

GENERAL DESCRIPTION

In the drawings and the following disclosure are shown several embodiments of an inflatable beadless fabric ply tire constructed according to the invention.

Figure 1:
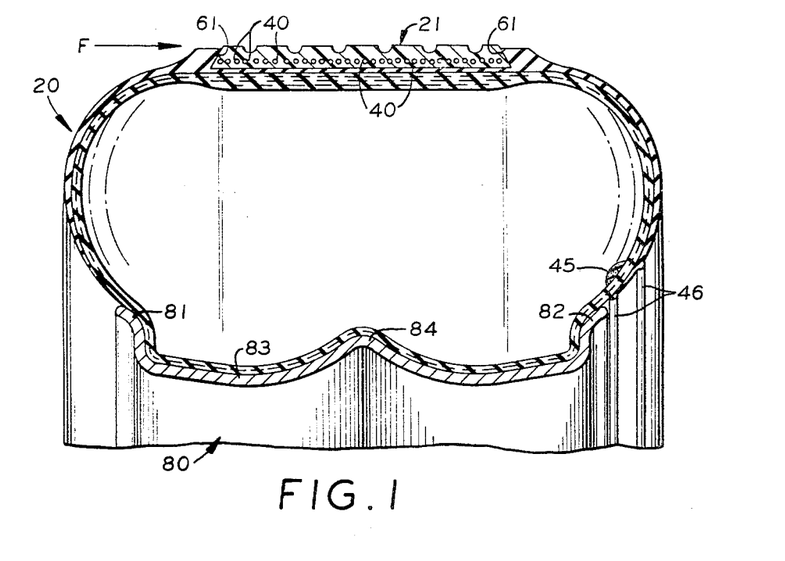
FIG. 1 is a cross-section through a tire on a mounting rim, constructed in accordance with the invention.
Figure 10:
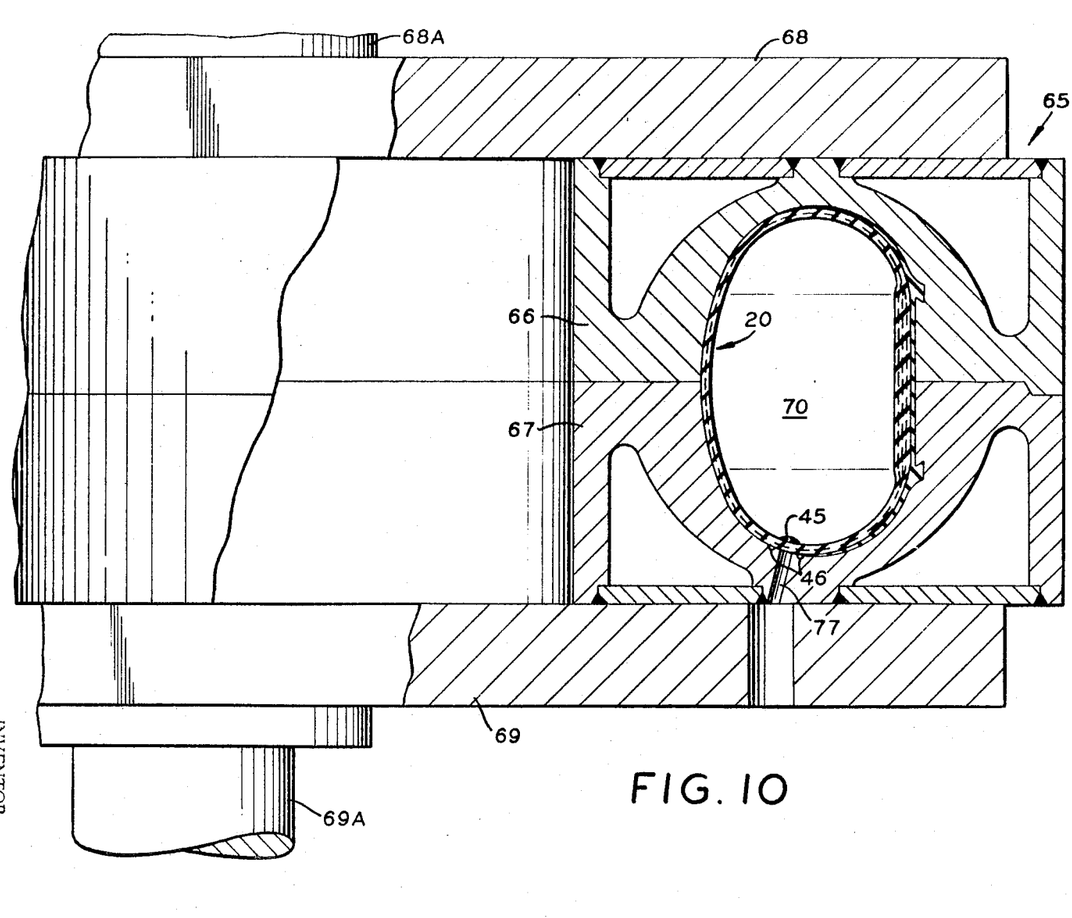
FIG. 10 is a more extensive cross-section of the curing press showing a tire being finally cured therein.
Figure 11:
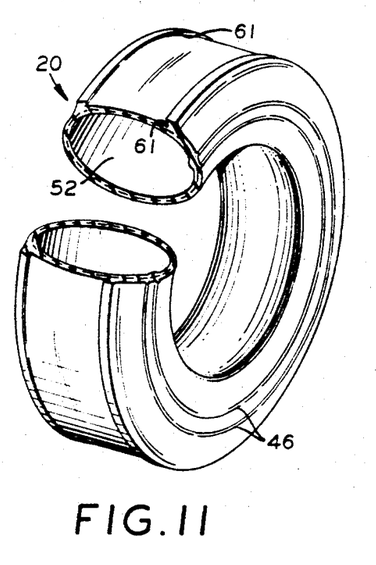
FIG. 11 is a perspective view of a tire carcass according to the invention with sidewalls especially adapted to carry a removable tread band.
Figure 12:
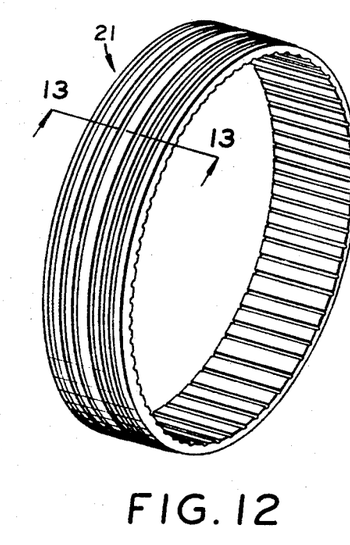
FIG. 12 is a perspective view of an endless tread band suitable for mounting on the tire carcass of FIG. 11.
Figure 13:
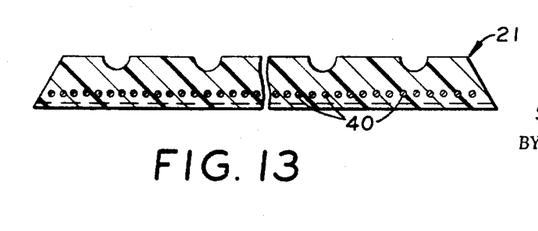
FIG. 13 (see drawing sheet 3), is a cross-section through a tread band as indicated on line 13—13 in FIG. 12.

In FIGS. 1, 10 and 11, the tire indicated generally by the numeral 20 has sidewalls especially shaped and adapted to carry a removable or replaceable tread band indicated generally at 21. (See also FIG. 13.)

Figure 14:
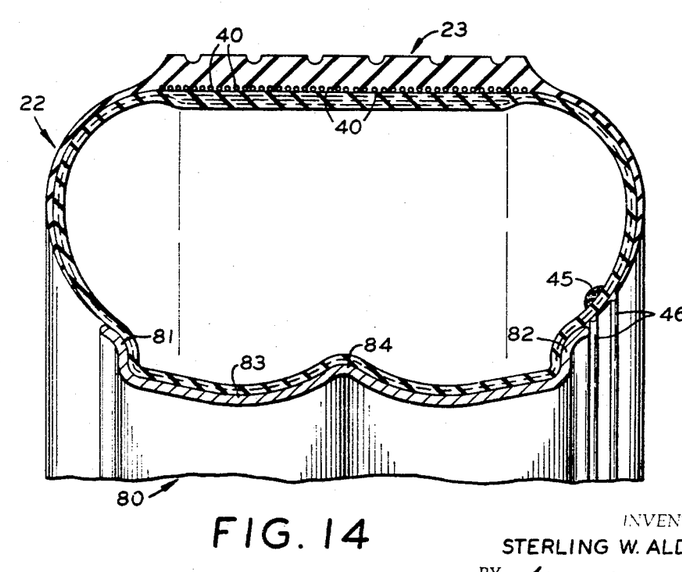
FIG. 14 is a cross-section, similar to FIG. 1, showing a tire having an integral tread portion on a mounting rim, constructed in accordance with the invention.

In FIG. 14, the tire indicated generally by the numeral 22 has a tread portion indicated generally at 23 formed integrally with the sidewalls.

Figure 15:
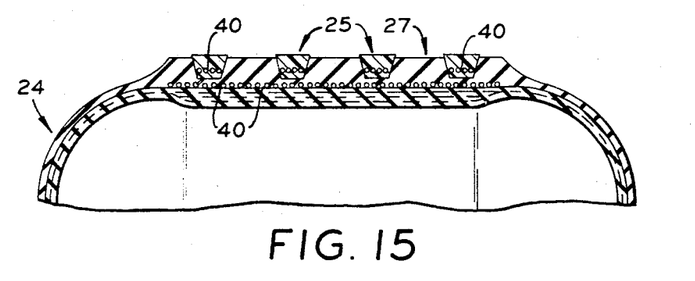
FIG. 15 (see drawing sheet 8), is a fragmentary cross-section, showing a tire with integral tread portions having pre-formed grooves adapted to carry a series of removable tread bands.

In FIG. 15, the tire indicated generally by the numeral 24 has a series of narrow width removable or replaceable tread bands indicated generally at 25 carried in correspondingly shaped grooves in the tread portion indicated generally at 27 formed integrally with the sidewalls.

Figure 16:
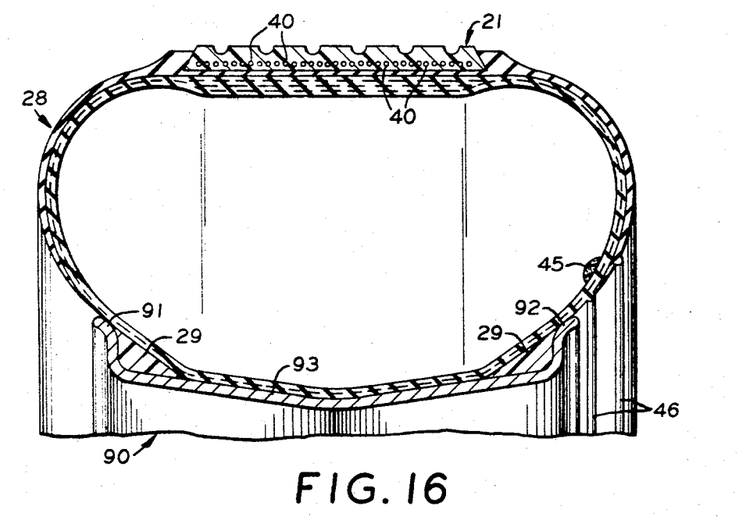
FIG. 16 is a cross-section through a tire such as shown in FIG. 1 adapted for mounting on a wide base rim.

In FIG. 16, the tire indicated generally by the numeral 28 has a tread band 21 and two annular ribs or rim engaging elements as indicated at 29.

Figure 17:
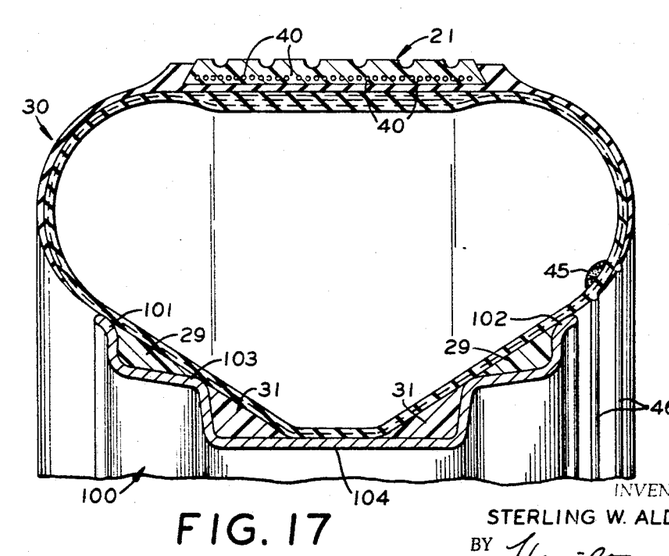
FIG. 17 is another cross-section through a tire such as shown in FIG. 1 adapted for mounting on a drop center rim.

In FIG. 17, the tire indicated generally by the numeral 30 has a tread band 21, two annular ribs 29 and two additional annular ribs or rim engaging elements as indicated at 31.

Figure 18:
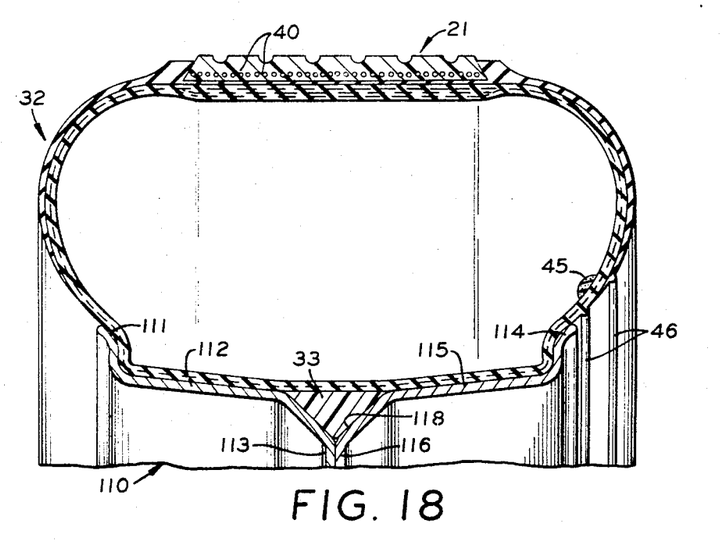
FIG. 18 is yet another cross-section through a tire such as shown in FIG. 1 adapted for mounting on a split or two-piece rim.

In FIG. 18, the tire indicated generally by the numeral 32 has a tread band 21 and a single medial annular rib or rim engaging element as indicated at 33.

Figure 19:
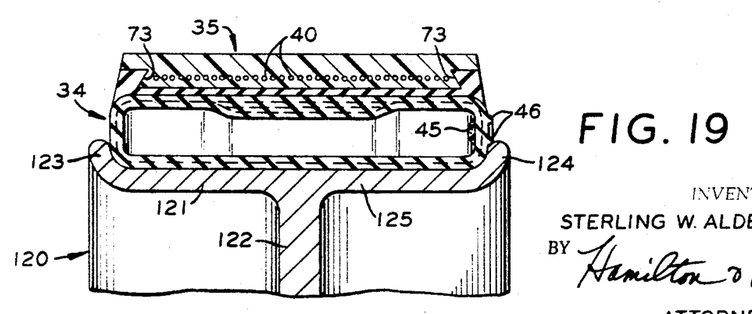
FIG. 19 is a cross-section showing an industrial type tire constructed in accordance with the invention mounted on a rim.

In FIG. 19, the tire indicated generally by the numeral 34 has a tread band indicated generally at 35.

Each of the tires constructed according to the invention has a profile or cross-section of greater width than height. Preferably, each of these tires has a width which is at least twice as great as the height when the tire is inflated.

Each of the tires constructed according to the invention has a series of parallel, spaced-apart circumferential strand elements, indicated generally by the numeral 40, restricting, restraining or limiting radial expansion or "growth" when the tire is mounted on a rim and inflated. The strand elements 40 are preferably continuous and non-extensible filaments or braids of a material such as metal wire, glass or synthetic fibers. In the tires designated 20, 28, 30 and 32, these strand elements 40 are embedded or incorporated in the tread band 21. In the industrial tire 34, the strand elements 40 are incorporated in the tread band 35. In the integral tread tire 22, the strand elements 40 are applied to the tire carcass during building and before application of the tread stock. In the combination tread and band tire 24, the strand elements 40 are incorporated in the tire carcass and each tread band 25.

Each of the tires constructed according to the invention may be provided or fitted, after vulcanization or curing, with a conventional valve assembly for inflation and deflation. The art knows of a number of suitable valves for this purpose. However, for purposes of production after removal of a tire carcass from the building drum and during subsequent vulcanization, as well as for convenience in subsequent utilization of a cured tire, it is preferred that a tire according to the invention have an integral, interior puncture sealing element indicated generally by the numeral 45.

The sealing element 45 is a strip of elastomeric material, which will become integrally bonded to the innermost fabric ply, and which will retain inherent self-sealing properties after the tire is vulcanized. A strip of butyl rubber, such as used to line the interior of conventional, tubeless tires, will function satisfactorily as the sealing element.

Figures 3, 4:
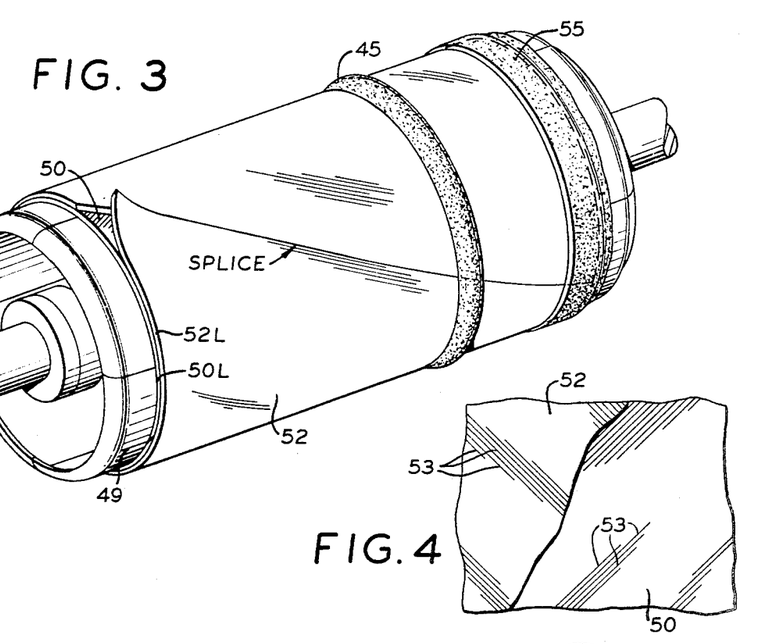
FIG. 3 is another perspective view, sequentially following FIG. 2, showing application of a second fabric ply, a continuous band of self-sealing material which functions for the selective inflation and deflation of a tire, and a thin strip of vulcanizable material which seals the fabric plies.
FIG. 4 is an enlarged fragmentary view, showing an orientation of the first and second fabric plies with the the chords at an angle of 90° to each other.

As shown in FIG. 3, the strip of the sealing element 45 is applied to the interior fabric ply during the building operation on the conventional drum. For convenience, the strip of the sealing element 45 may be applied as a full annular band although shorter segments could be applied transversely of the drum axis if desired. Also, if desired, the radial location and extent of the sealing element 45 may be indicated on the exterior of a tire sidewall by means of parallel circumferential raised ribs 46. These ribs may be formed initially by small grooves 47 on the surface of the building drum (see FIG. 6 or 7) and vulcanized within small grooves 48 in the curing mold (see FIG. 8 or 9).

Building the tire

Figure 2:
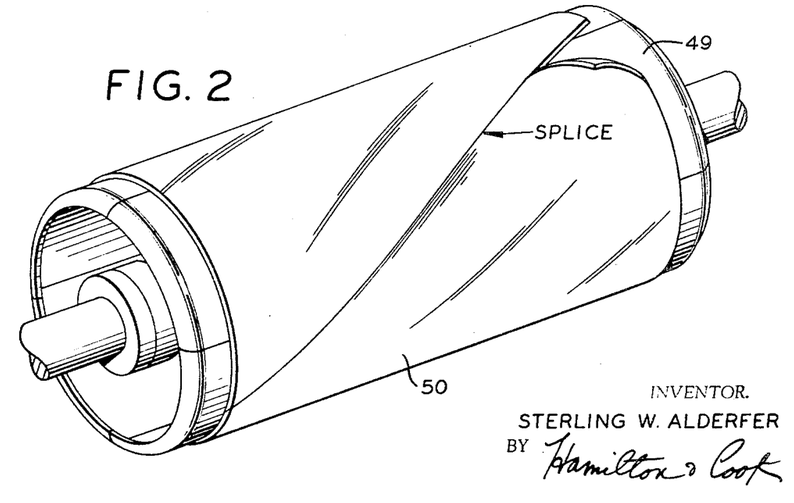
FIG. 2 is a perspective view of a conventional tire building drum, showing application of the first fabric ply in the construction of a tire according to the invention.

Referring to FIG. 2, a tire may be built according to the invention using a conventional, flat surface, cylindrical, rotatable and collapsible building drum 49. The first ply of bias cut rubberized fabric indicated at 50, cut to length on a conventional fabric bias cutter prior to delivery and application to the surface of the drum 49, is wound on the drum surface and the ends thereof are butt spliced together.

Referring to FIG. 3, thereafter a second ply of bias cut rubberized fabric indicated at 52 is wound on the drum surface and the ends thereof are also butt spliced together.

Referring to FIG. 4, the chords 53 of each fabric ply 50 and 52 extend substantially parallel to each other and are joined and interconnected, in a conventional manner, by a thin insulating coating of an unvulcanized or uncured elastomer such as rubber, as shown in FIG. 3 the first and second bias cut plies are applied to the drum 49 at predetermined chord angles one to the other; for example, at an approximately 90° angle as shown.

As illustrated and described herein, a tire is constructed according to the invention by applying a first ply 50 and then a second ply 52 on the building drum 49. These two full width plies are considered sufficient for the building of the majority of tires; particularly those tires intended for normal usage. However, narrower width strips of rubberized fabric could be applied to localized areas of the built up fabric for specific reinforcement. Further, large diameter or heavy duty tires could be built with three or more full width plies. Accordingly, as used herein, the term "multi-ply" is intended to mean two or more full width fabric plies, unless otherwise indicated.

Referring again to FIG. 3, after the second or last fabric ply 52 is laid on the building drum 49 the strip of sealing element 45, as described above, is applied in the area which eventually will constitute a sidewall of a cured tire. Also, there is applied to one end of the interior fabric ply 52 so as to overlie the end thereof another thin full annular band of an elastomeric material indicated generally by the numeral 55, which is used to seal the overlapping ends of the interior ply 52 when folded as described below. The "antiwicking" seal 55 may be an unvulcanized rubber compound which will become integral with the insulation coating of the fabric ply 52 during vulcanization or curing; making the interior walls of the tire carcass completely airtight.

After the operations shown in FIG. 3 are complete, the surface of the interior ply 52 is dusted with a release agent, such as a talc or silicone powder, so that the fabric plies when folded, as described below, may move apart when the carcass is partially inflated to toroidal shape (see FIG. 8).

Figure 5:
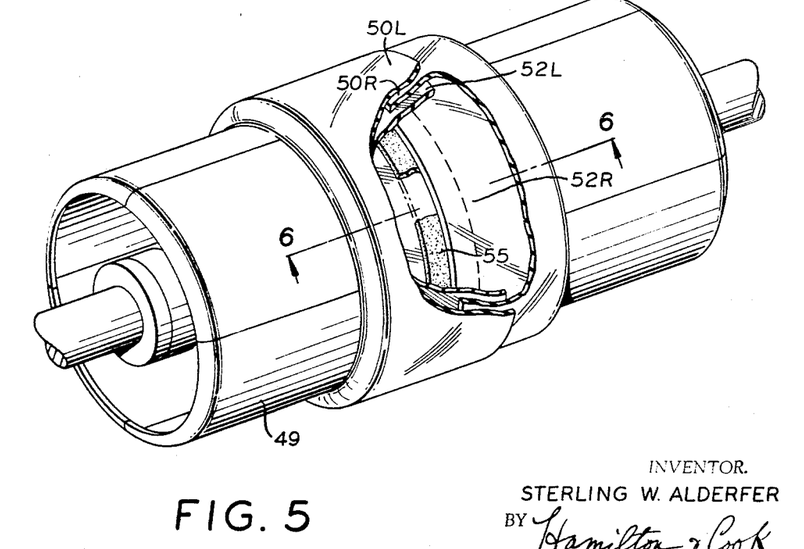
FIG. 5 is yet another perspective view, sequentially following FIG. 3, showing folding of the two fabric plies to form an uncured tire carcass.
Figure 6:
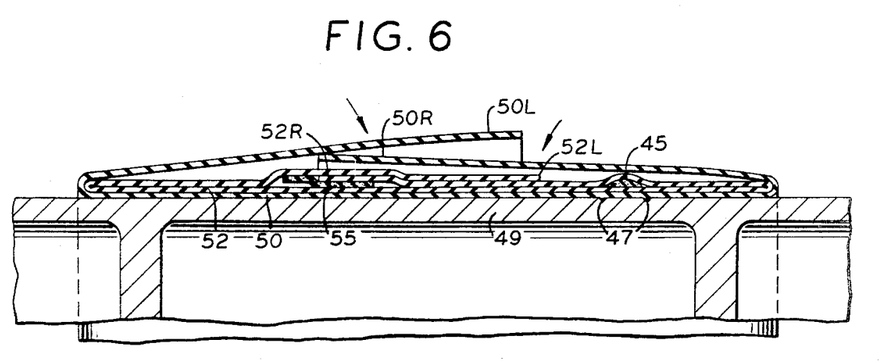
FIG. 6 is an enlarged cross-section taken substantially as indicated on line 6—6 of FIG. 5 showing the interleafing of the fabric plies during the folding operation.

Referring to FIGS. 5 and 6, after interior ply 52 is "dusted," the plies are folded toward the middle of the drum 49 so that the cylindrical ply ends are interleafed. For the purpose of explaining the folding operation, the ends of the interior fabric ply are designated 52R and 52L (the seal strip 55 being applied to end 52R) and the ends of the first fabric ply are designated 50R and 50L.

The folding operation is begun by moving ply end 52R inwardly toward the medial portion of the building drum 49. The opposite ply end 52L is then moved from a point substantially symmetrical with the point where the folding of 52R began so as to contact the seal strip 55 and substantially overlap ply end 52R. The ply end 50R is then moved to substantially overlap ply end 52L. The final fold is made by moving ply end 50L inward to substantially overlap ply end 50R. After the folding of the ply ends is complete, the composite laminate should be pressed or rolled as flat or as tight as possible.

Figure 7:
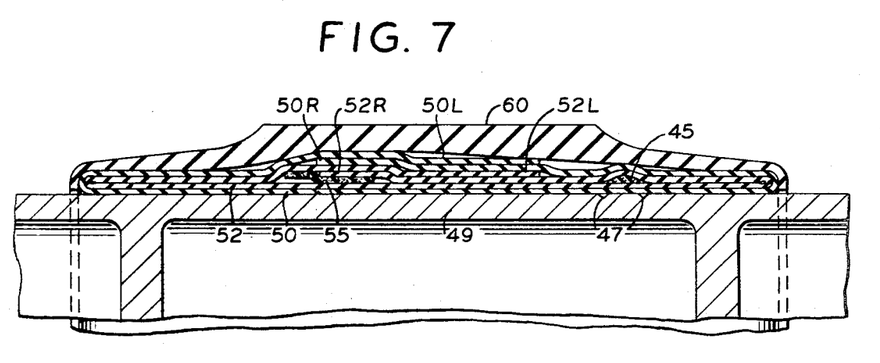
FIG. 7 is another cross-section, sequentially following FIG. 6, showing application of an annular band of stock forming the sidewalls and/or tread portion of an uncured tire carcass.

Referring to FIG. 7, after the plies are folded and flattened, a preferably preformed annular band of an elastomeric material, indicated at 60, is applied to substantially the full width of the folded exterior ply surface to complete the building of the tire carcass. The band 60 may be an unvulcanized rubber compound or "stock" which encases the outer surface of folded plies and which will become integral with the insulation coating of the fabric ply 50 during vulcanization or curing; forming the sidewalls and tread portions of the cured tire. The stock 60 could also be an elastomeric urethane material, applied as a preformed band or charged as reactant materials into a mold cavity containing a folded ply structure or composite laminate.

As has been shown for the purpose of illustration, the thickness of the mid portion of the stock 60 applied in FIG. 7 is sufficient to form the tread engaging walls (indicated at 61 in FIG. 1) for a cured tire 20 carrying a tread band 21. If the tire being built is of the integral tread type, tire 22 in FIG. 14, the thickness of the mid portion of the stock 60 would be greater to provide an elastomeric mass that could be cured in a tread pattern.

Referring specifically to FIGS. 14 and 15, the tires 22 and 24 have strand elements 40, described above, which are applied to and incorporated in the carcass during building of the tires on the drum 49. With reference to the building operations as described above, the embedded strand elements 40 for tires 22 and 24 would be tightly wound onto the folded plies after the folding depicted in FIG. 6 is complete and before the tread stock 60 is applied as in FIG. 7.

Curing the tire

A tire carcass, which has been built as described above with compounds requiring vulcanization and removed from the drum 49, is finally shaped during vulcanization or curing within a press or apparatus indicated generally by the numeral 65.

Figure 9:
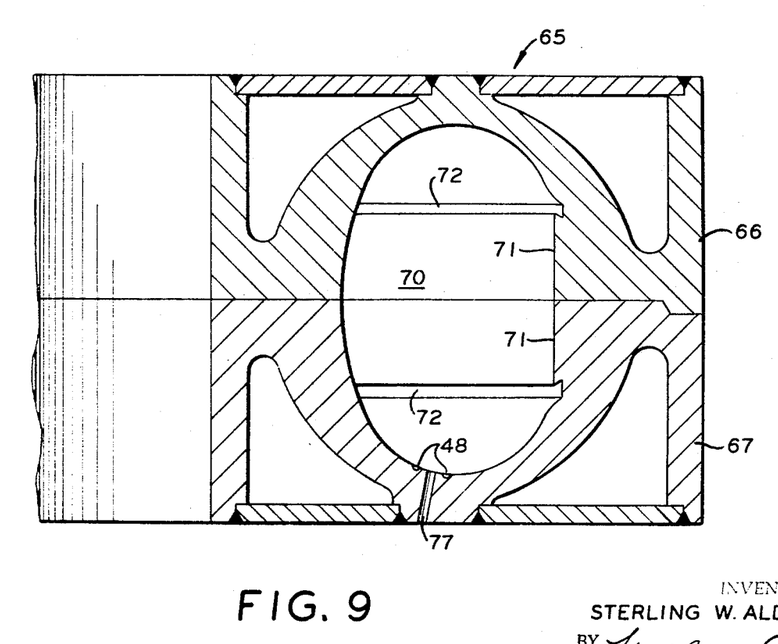
FIG. 9 is a cross-section through a portion of a curing press or vulcanizing apparatus having separable mold sections for curing a tire according to the invention.

Referring to FIGS. 9 and 10, a suitable press 65 should include separable mold sections 66 and 67. Each mold section is carried by a platen, 68 or 69. Each platen is in turn carried by a member, 70 or 71, adapted to provide for relative movement of the mold sections during opening and closing and to securely maintain the press closed during the actual curing operation. The mold sections 66 and 67 are heated in any approved manner; each may be cored out as shown for the circulation of steam or be housed within jackets or boxes which will supply the requisite heat for the vulcanization.

The final shape of a cured tire is determined by the contours of the mating molding surfaces of the halves or sections 66 and 67. As best shown in FIG. 9, the mold cavity, indicated generally by the numeral 70, defined by the mold sections is fully closed, and completely toroidal.

The mold cavity 70 as shown in FIG. 9 is intended to form a generally elliptical in cross-section and cured tire 20 carrying a tread band 21. The tread engaging walls 61 of a tire 20 are formed by the radially inwardly directed mating mold surfaces 71 and annular grooves 72. If the tire being cured is of the industrial type, tire 34 in FIG. 19, the mold cavity will be correspondingly shaped, generally rectangular in cross-section, with surfaces for forming the band engaging walls 73.

If the tire to be cured in a mold cavity 70 is of the integral tread type, tire 22 in FIG. 14, the additional mass in the thickened mid portion of the stock 60 could be cured in a tread pattern defined by an appropriate modification of the mold surfaces 71.

Figure 8:
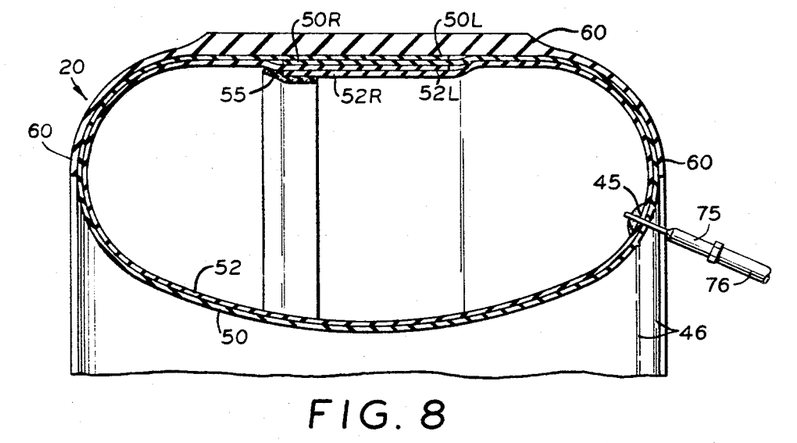
FIG. 8 is yet another cross-section, sequentially following FIG. 7, showing the uncured tire carcass after removal from the building drum and as partially inflated to toroidal shape, prior to vulcanization or curing.

Referring to FIG. 8, before a tire carcass is placed in a mold cavity 70 for final shaping and curing, it is preferred that the tire carcass be partially inflated to at least semi-toroidal shape. As shown, a suitable hollow inflating needle 75, supplied with air under pressure through a conduit line 76, may be inserted through the sealing element 45 to inflate the tire. This "pre-cure inflation" has at least two advantages. The tire carcass before curing is inherently fragile and subject to the possibility of ply separation or misalignment; a partially inflated tire may be handled without damage. Further, placement of a partially inflated tire in the fully toroidal mold cavity is done faster and with more ease.

The sealing element 45, needle 75 and conduit 76 may also be employed to advantage in the curing operation to regulate the pressure within a tire carcass being cured in the mold cavity. As best seen in FIG. 9, the mold section 67 has a small diameter orifice 77 communicating with the interior of the mold cavity 70 between grooves 48 and adjacent a portion of the sealing element. The orifice 77 will provide access for a hollow needle 75 to puncture the sealing element 45 while the tire carcass is in the mold.

A needle 75 inserted in the orifice 77 and through the sealing element 45 could be used to supply additional pressure within the tire carcass while the mold sections are closed as at the beginning or during the curing operation; as required, for example, to build up the interior pressure when a relatively low, and therefore thermodynamically slower, heat value was being used. Alternatively, the cured tire could be vented at the end of the cure period, before the mold sections are open, to reduce an excessive interior pressure to a desired level.

Tread bands

The tread bands 21, 25 and 35 are manufactured separately from the respective tires, 20, 24, and 34, on which they are mounted. The prior art knows of a number of ways in which such endless bands having the strand elements 40 embedded or incorporated therein could be manufactured.

By way of example, it is now known that suitable endless bands of elastic urethane having the strand elements 40 embedded therein could be manufactured by a process, comprising, winding a strand continuously on a series of spaced apart projections, placing said wound strands while on said projections within a mold cavity having inner, outer and at least one side molding surfaces, introducing a charge of urethane forming reactants into the mold cavity, and stripping the urethane and strand reinforcement from the mold cavity and said projections after the chemical reaction has run substantially to completion.

Mounting the tire

In FIGS. 1 and 14, the tires 20 and 22 are mounted on a rim indicated generally at 80. Rim 80 has low, radially outwardly directed side flanges 81 and 82 connected by a web portion 83 extending generally axially between the radially innermost portions of the side flanges 81 and 82.

The medial portion of the web 83 is formed to provide an annularly extending radially outwardly directed hump, or ridge, 84. The ridge 84 is also of low cross-sectional profile, extending radially outwardly only to the same extent as, or slightly more than the side flanges 81 and 82. The primary purpose of ridge 84 is to eliminate any puckering of the radially innermost portion of the tires 20 and 22 as they are inflated onto the rim 80 when it is desired to control the extent of the tire projecting beyond the low, side flanges 81 and 82.

For example, once the tires 20 and 22 are completed and vulcanized the peripheral dimension of the cross-section 15, particularly in view of the preferred 90° orientation of the fabric chords, is quite stable. Therefore, if one is desirous of revealing only a certain dimension of tire radially outwardly past the flanges 81 and 82, this dimension can only be controlled by the radial, or axial, extent of ridge 84 and the transverse lineal extent of the radially inner portion of the tire necessary to follow the convolutions of the rim 80 from flange to flange.

Another feature of tires constructed according to the concept of the present invention is also quite apparent when the tire is depicted in mounted position on a rim, and that is its lateral stability. Heretofore, it has been thought mandatory to provide tires with beads in order to keep them on the rim when they were subjected to high lateral loads, as in cornering. The subject tires, however, provide stability without the necessity of using beads.

This stability can be best pointed out by visualizing the application of a lateral force to the tread portion 21 of tire 20, say in the direction of the arrow F in FIG. 1. This lateral force F will tend to roll the tire clockwise, as viewed in FIG. 1, off the rim. However, the circumferential strand elements 40, irrespective of whatever they are in the tread band, the tire carcass or both, constrain the axial orientation of the radially outer portion of the tire, even as the tire attempts to roll (as shown in phantom), so that the distortion resulting from the application of force F tends to decrease the volume of the air chamber within the tire at the distorted area, thus increasing the pressure therein. Because the sidewalls of the tire will not stretch due to the chord orientation, and the strands 40 do not permit a radial growth of the tread area, this increase in pressure acts against the radially inner wall of the tire to force it more firmly against the rim, thus urging the tire back to its toroidal shape and thereby imparting the necessary and desired stability.

In FIG. 16 the tire 23 is mounted on another form of rim 90. The low side flanges 91 and 92 of rim 90 are connected by a web 93 presenting a slight outwardly directed concavity. To retain the generally elliptic normal cross-section of the tire as is necessary to present the widest profile of tire between the rim flanges and the tire tread, two annular ribs 29 are employed. Ribs 29 may be of elastomeric material formed as a part of the tire 28 itself, in which event the mold cavity in which the tire is cured would have to be appropriately altered, or can comprise inserts of any stable material positioned in the rim itself prior to mounting the tire thereon.

An additional pair of similarly annular ribs 31 are also utilized when mounting the tire 30 on the drop center rim 100 depicted in FIG. 17. Rim 100 also has low side flanges 101 and 102 joined by a web 103 having a drop center portion 104.

Rims 90 and 100 are standard rims well known to the prior art for mounting tires having beads. FIGS. 16 and 17 thus disclose at least two ways in which the subject beadless tire can be readily mounted to standard rims.

It will be readily apparent to one skilled in the art that the rims disclosed in FIGS. 1, 16 and 17, discussed above, do not include the means by which they are to be mounted on the wheel. The particular mounting means is not material to the present invention and has, for that reason, not been shown. Obviously, such well-known means as spokes or discs could be employed as well as mounting lugs, should it be desired to mount the rims on a wheel having a felloe surface.

In FIG. 18 another form of rim 110 is shown. Such a rim can well be fabricated from two narrow, hooped sheets of metal. One sheet has a flange 111 formed thereon which extends generally perpendicularly outwardly from one end of the web portion 112 to form one of the low, annular side flanges 111 of the completed rim. At the opposite end of the web 112 the metal is turned generally radially inwardly as a strut flange 113. The second sheet is constructed in mirrored relation with a side flange 114, a web 115 and a strut flange 116. With these two halves positioned with strut flanges 113 and 116 in abutting relation they may be joined together, as by welding or riveting, into an extremely rigid rim, it being strengthened by the groove 118 formed by the adjacent strut flanges 113 and 116. Facile mounting of the tire 32 on rim 110 is occasioned by the use of a rib 33 formed on the tire 32. By positioning the triangularly shaped rib 33 in groove 118 the tire is immediately oriented for inflation. Of course the rib 33 may merely constitute a filler inserted into the rim 110 independently of the tire 32.

One last example of mounting a tire constructed as taught herein is depicted in FIG. 19. The wheel 120 therein represents a heavy duty industrial tire, as used on dollies, carts, lifts and the like. The wheel 120 may be formed so that the rim portion 121 is integral with the disc, or spokes, 122 on which it is carried. Low side flanges 123 and 124 are provided on the axially inner and outer sides, respectively, of the rim portion 121 with a substantially axially flat web portion 125 extending therebetween. A tire, such as 34, used on a heavy load bearing vehicle of the nature above described need not have the most resilient ride possible but must be capable of supporting the heavy loads without imparting unnecessary shock loading into the vehicle.

The large width-to-height ratio of tire 34 makes it extremely stable; reduces the unnecessary resiliency; permits it to support heavier loadings; and, eliminates the necessity of providing a rim structure which must accommodate, or compensate for, the normally elliptic profile of the subject tires.

What is claimed is:
1. A method of making a tire carcass ready for curing, having at least two plies and a tread portion, on a flat surface cylindrical drum 49, wherein a length of rubberized fabric 50 is wound around said drum and the ends thereof are spliced to form the exterior ply of a cured tire and at least one additional length of rubberized fabric 52 is wound around said exterior ply and the ends thereof are spliced to form the interior ply of a tire, characterized in that, the exterior and interior plies 50, 52 are folded toward the middle of the drum so that (in such a manner that) the cylindrical ply ends are interleafed and forming an exterior seam on the outer surface of the folded plies, and the outer surface of the folded plies and the exterior seam are encased in an annular band of elastomeric material forming said tread portion, said tire carcass thereafter being removed from said drum and cured in a fully toroidal mold cavity to form a tire.

2. A method according to claim 1, further characterized in that, after removal from the tire building drum 49 the tire carcass is inflated to at least semi-toroidal shape before curing in the mold cavity.

3. A method according to claim 1 for producing a cured tire having an integral, interior puncture-sealing element on a side wall for use in selective inflation and deflation of the tire, further characterized in that a strip of sealing element 45 is applied to said interior ply 52 transversely of the axis of said drum 49 prior to folding of said exterior and interior plies.

4. A method according to claims 2 and 3, further characterized in that, the tire carcass is inflated by connecting a conduit 76 to the interior thereof through the strip of sealing element 45.

5. A method according to claims 2 and 3, further characterized in that, when the tire carcass is in the mold cavity a conduit 77 is connected to the interior thereof through the strip of sealing element 45.

6. A method according to any of the preceding claims, characterized in that the chords of said fabric lengths are laid at approximately 90° angle one to the other.

7. A method according to claim 1, further characterized in that, after folding of the fabric plies a series of parallel, spaced-apart circumferential strand elements 40 are tightly wound around the outer surface and the exterior seam, and the annular band of elastomeric material forming the tread portion encases said tightly wound strands.

References Cited

UNITED STATES PATENTS

| | | | |
|---|---|---|---|
| 3,004,575 | 10/1961 | Morse | 152—175 |
| 3,157,216 | 11/1964 | Maiocchi | 152—176 |
| 524,105 | 8/1894 | Doughty | 156—123 X |
| 709,021 | 9/1902 | Lefferts | 156—128 |
| 1,141,708 | 6/1915 | Hill | 156—128 |
| 1,192,994 | 8/1916 | Dees | 156—123 X |
| 1,918,553 | 7/1933 | Musselman | 156—128 X |
| 2,010,767 | 8/1935 | Maranville | 156—126 X |
| 2,609,026 | 9/1952 | Luchsinger-Caballero | 156—129 X |
| 2,915,102 | 12/1959 | Alexeff et al. | 156—123 X |
| 3,142,597 | 7/1964 | Anderson et al. | 156—123 |

FOREIGN PATENTS

| | | |
|---|---|---|
| 656,121 | 8/1951 | Great Britain. |
| 949,744 | 2/1964 | Great Britain. |

EARL M. BERGERT, *Primary Examiner.*

CLIFTON B. COSBY, *Examiner.*